United States Patent
Rawls

(10) Patent No.: US 6,269,773 B1
(45) Date of Patent: Aug. 7, 2001

(54) VACUUM FILTRATION MEANS AND APPARATUS FOR AQUARIUM GRAVEL CLEANING

(76) Inventor: Anthony Lee Rawls, 65 N. Fullerton Ave. #43, Montclair, NJ (US) 07042

( * ) Notice: Subject to any disclaimer, the term of this patent is extended or adjusted under 35 U.S.C. 154(b) by 0 days.

(21) Appl. No.: 09/460,354

(22) Filed: Dec. 13, 1999

Related U.S. Application Data

(60) Provisional application No. 60/112,113, filed on Dec. 14, 1998, and provisional application No. 60/059,691, filed on Sep. 20, 1997.

(51) Int. Cl.[7] ............................................. A01K 63/04
(52) U.S. Cl. ............................................. 119/259; 119/232
(58) Field of Search ......................... 119/259, 264, 119/245, 232; 15/1.7; 210/169, 241

(56) References Cited

U.S. PATENT DOCUMENTS

| | | | |
|---|---|---|---|
| D. 282,016 | * 12/1985 | Chestnut | ............ D30/106 |
| 3,225,930 | 12/1965 | Willinger . | |
| 3,360,129 | 12/1967 | Powers . | |
| 3,734,853 | 5/1973 | Horvath . | |
| 4,035,299 | * 7/1977 | Vroeginday | ............ 210/169 |
| 4,036,756 | * 7/1977 | Dockery | ............ 210/169 |
| 4,094,788 | 6/1978 | Dockery . | |
| 4,148,730 | * 4/1979 | Willinger | ............ 210/169 |
| 4,233,702 | 11/1980 | Zweifel . | |
| 4,610,784 | 9/1986 | Reyniers . | |
| 4,687,575 | * 8/1987 | Grose | ............ 210/169 |
| 4,722,670 | 2/1988 | Zweifel . | |
| 4,725,353 | 2/1988 | Whitman . | |
| 4,957,623 | * 9/1990 | Henzlik | ............ 210/169 |
| 5,048,140 | 9/1991 | Wu . | |
| 5,240,596 | * 8/1993 | Chesnut | ............ 210/136 |
| 5,279,730 | * 1/1994 | Chen | ............ 210/169 |
| 5,695,654 | 12/1997 | Schultz . | |
| 5,975,022 | * 11/1999 | Miller | ............ 119/264 |
| 6,007,713 | * 12/1999 | Michalik | ............ 210/169 |
| 6,058,884 | * 5/2000 | Rawls | ............ 119/259 |

* cited by examiner

*Primary Examiner*—Charles T. Jordan
*Assistant Examiner*—Yvonne R. Abbott

(57) ABSTRACT

A device for cleaning gravel in an aquarium includes a pump connected to a gravel casing such that the pump forms the top of the structure and the gravel casing the remaining body below the pump. The gravel casing houses the pump intake section and filtering material and when its base is placed over an area of gravel during cleaning will draw a debris and impurities water mixture from the gravel, and into the filtering material where the debris is trapped, thus filtering the water mixture which is returned to the tank via the pump's discharge section.

2 Claims, 2 Drawing Sheets

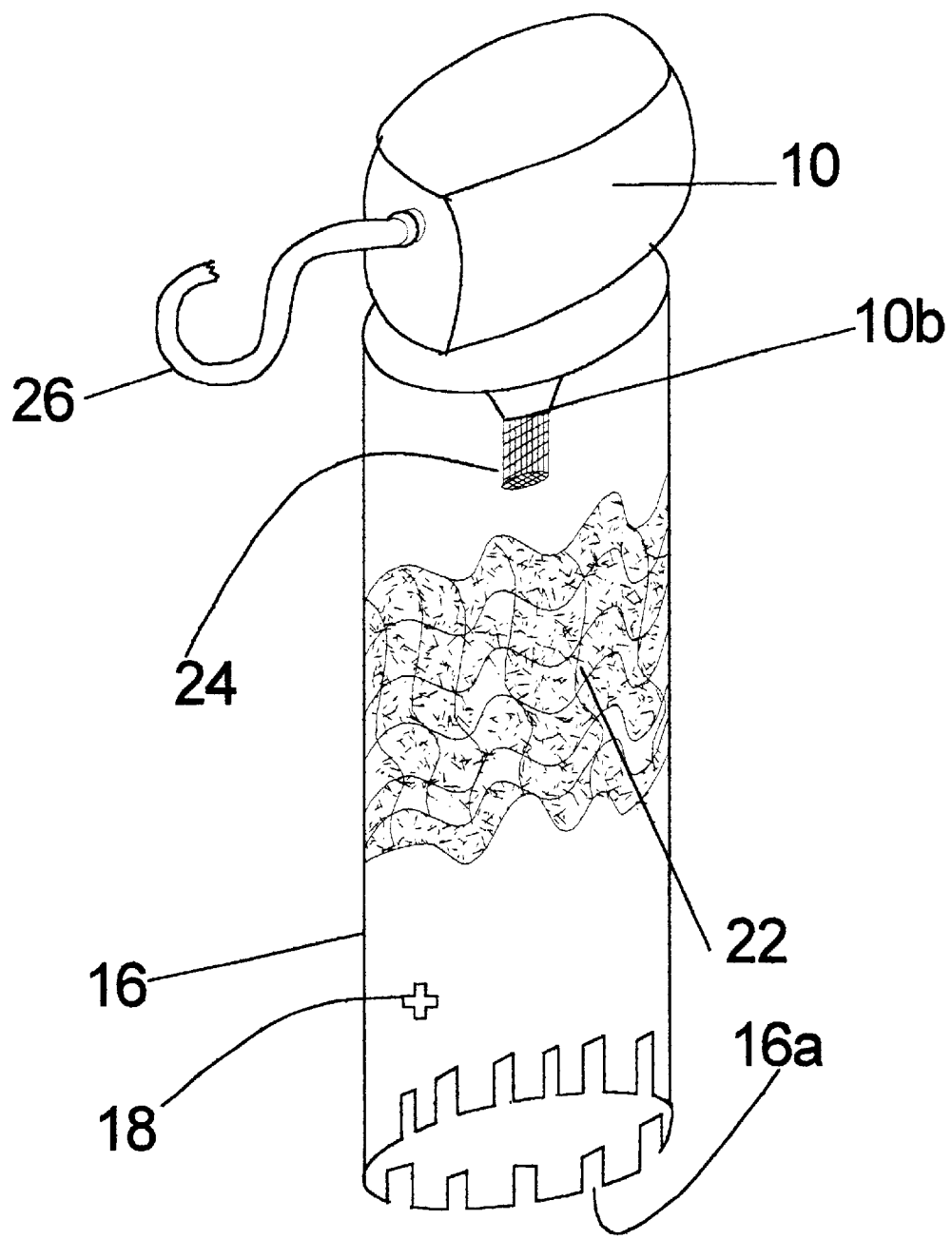

VACUUM FILTRATION MEANS AND APPARATUS FOR AQUARIUM GRAVEL CLEANING

CROSS REFERENCES TO RELATED APPLICATIONS

This application generally relates to Provisional Patent Application titled: Vacuum Filtration Means and Apparatus for Aquarium Gravel Cleaning, No., 60/112,113, filed Dec. 14, 1998; Provisional Patent Application, titled: Aquarium Gravel Surface Cleaning Means and Apparatus, No., 60/059, 691, filed Sep. 20, 1997, and Regular Patent Application, Titled: Aquarium Gravel Surface Cleaning Means and Apparatus, Ser. No., 09/140,093, filed Aug. 8, 1998.

STATEMENT REGARDING FEDERALLY SPONSORED RESEARCH AND DEVELOPMENT

N/A

REFERENCE TO A "MICROFICHE APPENDIX"

N/A

BACKGROUND OF THE INVENTION

1. Field of the Invention

The present invention is directed to a method and apparatus for use in removing debris which has settled within aquarium gravel, as well as for removing algae and other minute deposits which have adhered to the surface of aquarium gravel, and for draining and refilling the aquarium tank.

2. Description of Prior Art

A great deal of effort and energy has been devoted to cleaning aquarium gravel, and draining and refilling the aquarium tank since this is so crucial to maintaining good aquarium water quality. Prior art in cleaning aquarium aggregate is shown in a number of patents, including the following: Reyniers U.S. Pat. No. 4,610,784, Schultz U.S. Pat. No. , 5,695,654, and Willinger 3,225,930.

Each of these inventions includes a gravel agitation feature. Agitation of aquarium gravel is essential for loosening debris which may be buried deep within the gravel bed. Not until the debris is separated from the gravel, can the initial phase of the gravel cleaning processes demonstrated in all of these inventions begin.

In Reyniers, gravel agitation is incorporated into the aquarium draining process through the utilization of the Venturi principle. A flexible hose is provided having opposite ends, where one end is connected to one end of a larger diameter tube. The other end of the tube is placed adjacent the gravel covering the aquarium floor. A valve and a fitting provide means for connection to the end of a faucet that contains a venturi section. When the faucet is turned on, one position of the valve causes the water running out of the faucet to draw water from the aquarium for discharge into the drain below the faucet. The outward flow of water from the gravel tube, through the flexible hose, and into the drain, is sufficient to lift some of the gravel into the tube when it is placed almost fully in contact with the gravel. But this form of siphoning action creates a relatively slow water velocity leaving the gravel tube. This rate of wate r flow outward from the aquarium is sufficient to carry some fish wastes embedded within gravel, but not all of it, because the outward water flow does not stimulate sufficient gravel agitation to promote the degree of gravel to gravel surface contact required for a more thorough form of gravel cleansing.

The Schultz patent takes a different approach to gravel agitation. It is reportedly the result of tests which show that separating sediment and impurities from the gravel must take place totally outside the gravel tube and in the presence of an uninterrupted flow of water up through the discharge hose. Therefore, to accomplish gravel agitation, Schultz's method includes the utilization of a frame-supported, tooth-shaped grille that has formed therein a plurality of openings to allow passage of water, sediment and impurities into the discharge hose, but not the gravel. This tooth-shaped grille, in turn, is used by the operator to manually "manipulate" the gravel about the floor of the aquarium, or cause the gravel particles to "bump and grind"against each other as a means of loosening debris imbedded within the gravel so that the debris when loosened is thereby drawn into the openings of the tooth-shaped grille and through the discharge hose before terminating into the drain.

Unfortunately, this method of gravel agitation presents its own problems. Once again, like the Reyniers method, it too incorporates the use of the Venturi principle in the aquarium draining process as a means of cleaning aquarium gravel. Granted, the Schultz method is not designed to agitate gravel by way of draining the aquarium, but it does depend on the draining process to carry fish wastes out of the tank once these wastes have been stirred up by the operator of the tooth-shaped grille.

For example, in order to agitate debris-laden gravel at the bottom of an aquarium gravel bed with a depth of three or more inches, the operator of the tooth-shaped grille has a choice of either using the device to sweep away the top layers of gravel, or use the device to plow down deep inside the bed. The plowing, digging, and raking of gravel with the tooth-shaped grille has the potential for creating considerable cloudiness in the aquarium and thereby disturbing the inhabitants with organic pollutants, especially in aquariums that are not regularly cleaned. For best results in using this apparatus, one must exercise extreme care and patience in manipulating the grille in order to do a thorough job of cleaning the gravel while not violating the twenty-percent water volume change rule. To accomplish this feat requires traits that are not always present in those who care for aquariums.

Both Reyniers and Schultz utilize aquarium gravel cleaning approaches that wastes considerable amounts of water, since they incorporate the use of a water faucet pump which requires water flow from a faucet in order to drain the aquarium tank and thereby provide means for cleaning aquarium gravel. In fact, some pet store owners prohibit their employees from cleaning their aquariums this way because of the high water bills which may be generated in a commercial setting by using the Reyniers and Schultz's methods of aquarium gravel cleaning.

Willinger's device appears to be the closest prior art in structure. But the limitations of its size and pumping capacity makes its application limited to smaller aquarium. It contains no provision for aquarium water changes. In practice the operation of the device, as the inventor points out, may be impeded by gravel or waste matter clogging the pump's motor.

Attention is also directly to the following: U.S. Pat. Nos. 4,233,702, 4,094,788, 3,225,930; 3,360,129; 3,734,853; 4,722,670; 5,655,245; and 4,725,353.

BRIEF SUMMARY OF THE INVENTION

The present invention provides a method for removing sediments which have settled within the aquarium gravel bed and also performing an aquarium water change in larger aquariums of 46 gallons or more. It is characterized by one longitudinal member whose top is a pump and whose main structure is a gravel casing. The device is designed to be fully submerged in aquarium water. It has an opened bottom for communication with the aquarium gravel bed. One of more apertures or openings on the casing's wall and base edges allow water passage therethrough when the base is placed over a section of gravel and held firmly against the aquarium floor. Agitation of gravel and water located in the interior boundary of the casing results when aquarium water located at the bottom exterior of the casing is drawn by pump-induced force into the gravel casing by way of apertures and openings located at the base wall of the casing and in the casings base edges. The agitation releases impurities embedded within the gravel and the impurities and aquarium water mixture in turn are further drawn through filtering material packed within the gravel casing interior. The aquarium water and debris mixture, filtered of particulate matter, is recycled back into the aquarium water at the pump's discharge end, which is threadably designed for communication with a conventional garden hose fitting, for draining the aquarium after cleaning the gravel.

BRIEF DESCRIPTION OF THE SEVERAL VIEWS OF THE DRAWINGS

FIG. 2 is a side elevational view of the present invention, illustrated with filtering media and water hose attachment.

Figure 1:
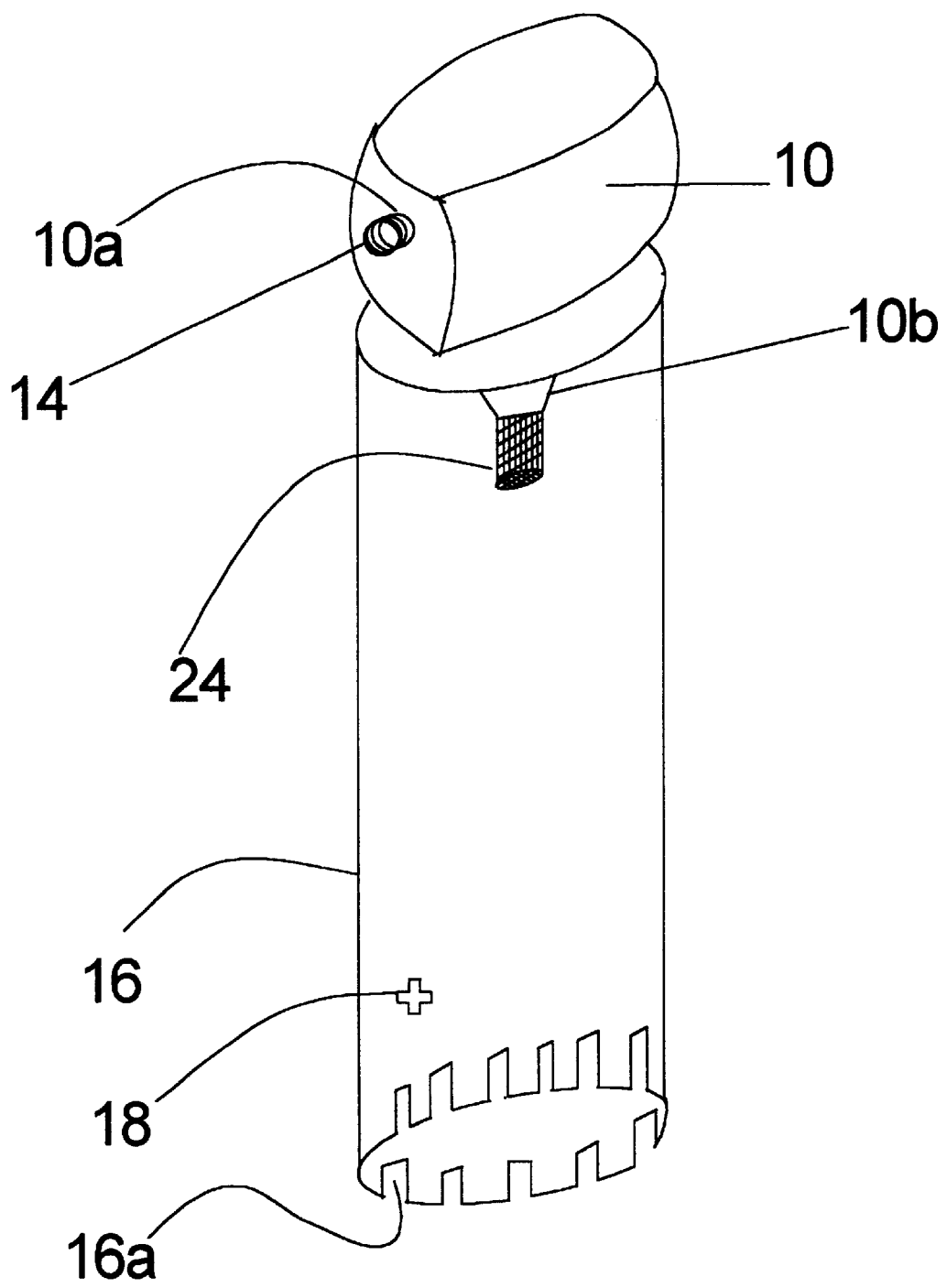
FIG. 1 is a side elevational view of the present invention.

The following description and drawings are designed to promote a better understanding of the present invention. However, they should by no means be interpreted as limiting the scope of the invention, since further alterations or modifications would be expected to occur to one skilled in the art to which this invention applies.

REFERENCE NUMERALS IN DRAWINGS

10 Submersible water pump
10a pump discharge end
10b pump inlet end
14 Male garden hose threaded fitting
16 ravel casing
16a gravel casing base edge
18 gravel casing aperture
22 filtering fiber
24 plastic screen
26 water hose

BEST MODE FOR CARRYING OUT THE INVENTION

Referring now to FIG. 1, the aquarium gravel cleaning apparatus comprises a pump 10, a gravel casing 16, forming one longitudinal unit. The pump discharge end 14 is adapted for use with a garden hose threaded female fitting of a water hose 26. Filtering material 22 is inserted into the interior section of the gravel casing 16. The aquarium gravel cleaning operational process begins when the device is fully submerged into an aquarium, its top which is the pump 10 covered with water and the base of the gravel casing 16 encircling an area of gravel covering the aquarium floor. The submerged gravel casing 16 is held in this vertical position, and pressed downward into the gravel as far as it will go.

The pump inlet end 10b draws water through the filter 22 where particulate matter is trapped before the water is recycled back into the aquarium by way of the pump's discharge end 10a. Debris and impurities which may have settled on top of the gravel contained in the casing 16 are thus pulled into the filtering ring material 22 and trapped there. The amount of filtering material 22 in the gravel casing is predetermined as a means of affecting a number of processes, including the degree of vacuuming force within the gravel casing 16, since an increased amount of filtering material 22 will result in a decreased amount of vacuuming force or pull within the gravel casing, as well as the filtration quality since the density of 100 percent polyester filtering fiber for example which is packed into the gravel casing 16, will determine the concentration level of particulate matter held within the filtering material 22 during filtration. With the gravel casing 16 held against the floor of the aquarium in this upright position, the drawing action of the pump 10 continues to pull aquarium water into the casing 16 at its base edges 16a and through an aperture 18 located on its circular wall at its base. Water enters the casing 16 with intense velocity under these conditions and results in collissional gravel to gravel surface contact. Maintained in this position the intensity of the gravel and water agitation will have the effect of dislodging debris and impurities embedded within the gravel bed as well as debris which may have bonded to the surface of the gravel particle. When the gravel casing 16 is lifted from the section of gravel pre-selected for cleaning, the gravel within the gravel casing 16 generally falls back to the aquarium floor due to the forces of gravity. When it does not, simply placing one's finger over the pump's discharge port 10a will cause the gravel to be released from the filtering material from which it made contact.

This step just outlined is repeated, i.e., the gravel casing 16 is placed over another area of gravel selected for cleaning until all of the gravel is cleaned.

The pump outlet end 14 is a garden hose threaded male fitting so that a water hose 26 with a female garden hose threaded fitting can be used to interconnect the two in order to allow water discharge from the aquarium following gravel cleaning.

The length of the hose 26 is predetermined to suit the particular need of the user. For example, a 25 foot hose may be used to discharge aquarium water into a drain. The same hose 26, disconnected from pump discharge end 10a but maintained in the aquarium, may then also be used to refill the aquarium from a water faucet.

The plastic screen 24 covering the pump inlet 10b provides added protection to prevent small debris from entering the pump 10 and for preventing filtering material 22 from entering the pump 10.

What is claimed is:

1. An aquarium gravel cleaning device comprised of a pump, said pump having an inlet end and an outlet end, said inlet end is covered by a strainer, said outlet end is designed for threadable communication with a female coupling of a conventional garden hose, said pump having means for vacuuming aquarium gravel, means for recycling aquarium water, means for draining the aquarium, means for promoting distinct patterns of gravel and water rotational motion, means for activation through communication with a power generating means;

a gravel casing, said gravel casing having opposite ends, one end having apertures formed in and around said end, the other end having means for communicating with the pump's inlet end so as to form one complete monolithic unit, said means for communicating with the pump's inlet end so as to form one complete monolithic unit comprises a watertight connection between the gravel casing and the pump, said gravel casing further having means for encircling an area of aquarium gravel covering the floor of the aquarium, means for communicating aquarium water located outside of the gravel casing with aquarium water located inside the gravel casing, and means for housing filtering material, whereby, one structure is formed in an orientation in which the pump is the top of the aquarium gravel cleaning device, while the gravel casing is the portion of the device directly below the pump while the pump's inlet end is the portion the pump extending into the gravel casing and covered by the strainer, the filtering matter is contained in the gravel casing below the pump's inlet end, while the pump's outlet end is the portion of the pump which extends into the aquarium water located outside the gravel casing.

2. A method of cleaning aquarium gravel using the aquarium gravel-cleaning device as disclosed in claim 1 comprising the following steps:

pump means for vacuuming aquarium gravel, said pump means for recycling aquarium water, said pump means for draining the aquarium, said pump means for promoting distinct patterns of gravel and water rotational motion, said pump means for providing liquid communication between the male fitting discharge end of the pump and the female fitting end of a conventional garden hose, and said gravel casing means for encircling an area of aquarium gravel covering the floor of the aquarium, said gravel casing means for communicating aquarium water located outside of the gravel casing with aquarium water located inside the gravel casing, and said gravel casing means for housing filtering material comprises the steps of the following:

a) grasping the aquarium gravel-cleaning device by its pump;

b) inserting the device into the aquarium and holding it vertically;

c) exerting downward pressure on the device so as to encircle a predetermined area of aquarium gravel selected for cleaning;

d) continuing downward pressure on the device to force it toward the floor of the aquarium as far as it will go;

e) sustaining downward pressure for a time predetermined as necessary for the pump to draw water through the filter where gravel debris is trapped before the water is recycled back into the aquarium by way of the pump's discharge end;

f) lifting the device from the clean gravel and repeating steps c through f until desired gravel cleaning has been achieved;

g) disengaging the power generating means from the pump;

h) removing the aquarium gravel-cleaning device from the aquarium;

i) removing the filtering matter from the gravel casing;

j) attaching threadably the female coupling end of a standard garden hose to the male-coupling-oriented discharge end of the pump;

k) placing the opposite end of the garden hose over a drain;

l) reintroducing the device into the aquarium so that the pump is immersed in aquarium water;

m) re-engaging the power supply to the pump, wherein, the application of these steps starts the vacuuming action of the pump which sets in motion the following chain of events:

the promotion of a predetermined velocity of aquarium water entry into the gravel casing by way of apertures located in and around said gravel casing's base edges;

patterns of collisional gravel agitation to dislodge debris and impurities embedded within the gravel and to dislodge debris which has bonded to the surface of the gravel as a direct result of the predetermined velocity of aquarium water entry into the gravel casing by way of apertures located in and around the casing's base edges;

the suction needed for drawing aquarium water through the filter and trapping debris there before recycling the same water back into the aquarium.

* * * * *